US007464735B2

(12) United States Patent
Shultz

(10) Patent No.: US 7,464,735 B2
(45) Date of Patent: Dec. 16, 2008

(54) FUNNEL STAND WITH RETRACTABLE HOSE

(75) Inventor: Chad Shultz, Conyers, GA (US)

(73) Assignee: Kelcamax Innovations, LLC, Atlanta, GA (US)

( * ) Notice: Subject to any disclaimer, the term of this patent is extended or adjusted under 35 U.S.C. 154(b) by 224 days.

(21) Appl. No.: 11/448,419

(22) Filed: Jun. 7, 2006

(65) Prior Publication Data

US 2006/0278664 A1 Dec. 14, 2006

Related U.S. Application Data

(60) Provisional application No. 60/688,439, filed on Jun. 8, 2005.

(51) Int. Cl.
*B65B 39/00* (2006.01)
*B01D 29/07* (2006.01)

(52) U.S. Cl. ....................... 141/343; 141/340; 141/341; 141/382; 248/94

(58) Field of Classification Search ................. 141/230, 141/331-345, 363-366, 382; 222/530; 248/94, 248/127
See application file for complete search history.

(56) References Cited

U.S. PATENT DOCUMENTS

| | | | | | |
|---|---|---|---|---|---|
| 2,150,025 | A * | 3/1939 | Cook, Jr. et al. | | 222/36 |
| 2,192,862 | A * | 3/1940 | Eagley | | 222/36 |
| 2,212,749 | A * | 8/1940 | Pelouch | | 222/609 |
| 2,366,529 | A * | 1/1945 | Hoff | | 141/106 |
| 2,965,196 | A * | 12/1960 | Rich, Jr. | | 95/143 |
| 4,416,396 | A * | 11/1983 | Ward | | 222/129 |
| 4,638,841 | A * | 1/1987 | Heath | | 141/98 |
| 4,972,972 | A * | 11/1990 | Goguen | | 222/130 |
| 4,997,003 | A * | 3/1991 | Brennan | | 137/147 |
| 5,540,264 | A * | 7/1996 | Harp | | 141/106 |
| 5,634,502 | A * | 6/1997 | Pierce | | 141/98 |
| 5,667,113 | A * | 9/1997 | Clarke et al. | | 222/608 |
| D395,439 | S * | 6/1998 | King et al. | | D15/150 |
| 5,878,799 | A * | 3/1999 | Hannick | | 141/351 |
| 5,921,262 | A * | 7/1999 | Campbell | | 137/1 |
| 5,961,048 | A * | 10/1999 | Prieschl et al. | | 239/146 |
| 6,631,712 | B2 * | 10/2003 | Koncelik, Jr. | | 126/25 C |
| 7,137,419 | B1 * | 11/2006 | Reeves | | 141/340 |

* cited by examiner

*Primary Examiner*—Timothy L Maust
(74) *Attorney, Agent, or Firm*—Michael J. Mehrman; Mehrman Law Office PC

(57) ABSTRACT

A funnel stand that includes a housing supporting an internal funnel connected to a fuel hose that can be folded or rolled up for storage inside the housing and extended through a hose opening for placement in a fuel tank opening. The funnel stand may also include a ballast to stabilize it as a free-standing device or a base plate configured for permanently or semi-permanently affixing the funnel stand to a loading surface. In addition, the funnel stand may include a lid covering the funnel opening, a door covering the hose opening, and handles to facilitate carrying the device by hand. The funnel stand is designed to be suitable for delivering fuel from a hand-held gas can into the fuel tanks on small watercraft, such as small boats and personal watercraft.

19 Claims, 7 Drawing Sheets

FUNNEL STAND WITH RETRACTABLE HOSE

REFERENCE TO RELATED APPLICATION

This application claims priority to commonly owned U.S. Provisional Patent Application Ser. No. 60/688,439 entitled "Fuel-Link For Watercraft" filed Jun. 8, 2005, which is incorporated herein by reference.

TECHNICAL FIELD

The present invention pertains to the field of fueling systems and, more particularly, to a funnel stand with an internal funnel connected to a retractable hose. The funnel stand is particularly well suited fueling a small watercraft from a hand-held gas can while the watercraft is afloat on the water.

BACKGROUND

Filling up a fuel tank on a small boat, personal watercraft (e.g., jet ski®) or other watercraft can be difficult, potentially dangerous in rough water, and often results in damaging fuel spills. This is because the watercraft is typically floating and rocking on the water and, for small vessels, the fuel tank opening is usually located well below the level of the dock where the operator can safely walk and stand. This makes it inconvenient and often quite difficult and potentially dangerous to fill the tank while standing or kneeling on the dock, especially in rough water and high waves caused by boat wakes. When onboard the vessel, it can also be difficult to find a stable way to pour fuel from a hand-held gas can into the tank opening. This problem is particularly acute for very small vessels such as personal watercraft and small motor boats. For larger vessels and those floating next to low floating docks, the fuel tank opening may be located well above the dock, which can also presents problems with filling the tank. Even filling a portable fuel tank can be difficult, requiring the operator to bend over the tank while leaning away from the fumes coming out of the tank.

In addition, for many vessels the fuel tank opening can be too small to allow a fuel pump handle to enter and rest in the tank opening, which requires the operator to hold the pump handle in place while filling the tank. Because the fuel conduit into the onboard gas tank often lacks a proper vent, the gas can back up and spit back out of the fuel tank opening while fueling, which causes the gas to spill onto the side of craft, onto the operator's hands and, unfortunately, into the water. As a result, a sheen of gasoline and diesel fuel often accumulates on the top surface of the water in many marinas, which fouls the nearby shores and presents a hazard to the boats, boaters, marina operators, wildlife and natural surroundings. Sooner or later, it can be expected that the governing authorities will crack down and require safer and more environmentally sound practices for fueling watercraft.

As another consideration, fuel at marinas is typically quite a bit more expensive than the same type of fuel at land-based gas stations, and land-based gas stations often carry a higher octane grade of fuel that is not available at many marinas. Also, taking the watercraft to a marina for fueling can be very time consuming and many marinas experience long lines during peak times, when the boat owners would much prefer to be out on the water rather than traveling to the marina and waiting to fill up the fuel tank. These factors provide strong incentives for filling up the watercraft's fuel tank with gas purchased at a land-based station. Nevertheless, the difficulties experienced with fueling the watercraft with a hand-held gas can still inhibits many boaters from fueling the watercraft in this manner. In fact, without some type of device to help deliver the fuel from a gas can or other suitable container into the fuel tank on the watercraft in a clean and safe manner, many boaters elect to use the marina despite the associated drawbacks. And many small boat and personal watercraft owners who have tried to fill their watercraft with a hand-held gas can have stories of being swamped, knocked about or even overboard, and spilling fuel while trying to fill the tank.

One product known as the Fuel-Buddy® has been developed in an attempt to solve this problem. This particular device includes a fuel holding tank that typically holds about 25 to 30 gallons of fuel and includes a retractable hose to deliver the gas from the holding tank to the watercraft. However, this product is not suitable for many potential users because it is relatively expensive (currently selling in the $250-300 range) and difficult to use because it is quite heavy for an individual to handle when full. Because the device is too large to fit into many passenger vehicles and so heavy when full, it generally requires a truck, trailer or some other gear to help transport the device back and forth from the gas station.

As a result, there is a need for an easier, safer, more convenient, more cost effective, and more environmentally friendly way to load fuel onto watercraft while they are in the water. There is a further need for a better way to load fuel purchased at a land-based gas station onto watercraft while they are in the water, particularly while they are floating at a private dock. It would also be beneficial for the device to be universal for many different locations, unobtrusive, attractive to the extend practical, light weight, and generally safe, easy, and convenient to use.

SUMMARY OF THE INVENTION

The present invention solves these problems in funnel stand with a retractable hose known as a Fuel-Link™ or Gas-Link™. The funnel stand includes a housing that supports an internal funnel having a spout that is connected to one end of an elongated hose. The hose can be extended through a hose opening in the housing so that the opposite end of the hose can be placed into the fuel tank opening on a watercraft. The user then pours the fuel from a hand-held gas can into the funnel, which is supported by the housing of the funnel stand, to deliver the fuel into the fuel tank of the watercraft. When the funnel stand is not in use, the hose can be retracted, typically by folding or rolling up the hose, for storage inside the housing of the funnel stand. In addition, the funnel stand may also include a removable or hinged lid that covers the funnel opening at the top of the housing to keep rain, dirt and debris out of the device while the device is not in use, and which allows the funnel stand to serve as a handy seat or tool rest. And, if desired, the funnel stand may also include a door that covers the hose opening to improve the neatness of the appearance and keep water, debris and dirt out of the interior of the housing. The ability to store the fuel hose inside the housing of funnel stand gives the funnel stand a nice clean appearance and keeps the hose from getting dirty and causing a tripping hazard over the course of the boating season.

The funnel stand allows a single user to easily fill a watercraft with fuel from a conventional hand-held gas can while taking a well balanced stance on a dock or seawall. Since the funnel stand supports the funnel without the aid of human hands, the user has both hands free to support the gas can. Also, the fuel hose preferably has a diameter, such as three-quarters of an inch, selected to easily fit into the fuel tank opening on small watercraft so that a sufficient length of the hose can be inserted into the tank to hold the hose in place while fueling. Once the operator has boarded the watercraft to place hose so that it is held in place in this or another suitable manner, for example with a clip or tie, the operator can return to the dock to safely and quickly fill the watercraft fuel while standing on the dock and pouring the fuel from the gas can into the funnel of the funnel stand. Personal watercraft owners, in particular, will appreciate the convenience and advantages of the funnel stand in that it allows a single individual the ability to safely and easily fill the fuel tank on the watercraft, while it is afloat on the water, with a hand-held gas can filled at a land-based gas station.

It should also be appreciate that a typical five-gallon gas can may be transported in almost any type of road worthy motor vehicle without a trailer or other special gear or equipment. As gasoline can usually be purchased less expensively from a land-based gas station than at a marina, the savings in fuel cost quickly pays for the acquisition cost of the funnel stand. The funnel stand may also make it easier and less expensive to purchase higher octane fuel and impart accurately measured amounts fuel additives, such as oil, an engine cleaning agent, or an octane booster into the fuel before it is loaded onto the watercraft. The funnel stand also eliminates the "spit-back" issue because the fuel hose can be made to fit into the throat of the watercraft fuel conduit leading to the fuel tank and extended well into the fuel conduit or even all the way into the tank. The fuel hose, which should be at least a little narrower that the fuel conduit, allows air to escape so that the fuel does not back up and spit out of the fuel port.

The funnel stand can be deployed in a permanently or semi-permanently mounted version in which the funnel stand may be screwed, bolted or otherwise affixed to dock, pole, watercraft or other desirable location. In another embodiment, the funnel stand may be deployed as a portable device with handles to facilitate carrying the device from one slip to another and storing it in a safe location, perhaps under lock and key, when it is not in use. Another version of the funnel sand may be located on the watercraft itself either permanently, semi-permanently or temporarily during fueling, which may be advantageous for certain larger vessels that experience spit-back problems while fueling. An embodiment that is particularly well suited for small, private watercraft located at private docks has a size and weight appropriate for a single person to carry. For this application, the funnel stand can be made from a light-weight plastic material sized to house about ten feet of fuel hose and still be easily carried by most people.

Generally described, the invention may be practiced as a funnel stand for delivering fuel into a fuel tank that includes a housing defining a hose storage area and comprising a hose opening, a bottom end, and a top end having a funnel opening. The funnel stand also includes a funnel supported by the housing in communication with the funnel opening in the top of the housing. The funnel includes a spout that is in communication with a fuel hose that is configured to be selectively retracted for storage within the housing or extended through the hose opening for placement in communication with a fuel tank opening. The funnel stand may also include a lid configured for selective covering the funnel opening and a door for selectively covering the hose opening.

In a free-standing embodiment, the funnel stand may also include a ballast proximate to the bottom end of the housing for stabilizing the funnel stand as a free-standing device. The ballast can be built into the funnel stand or it can be a separate weight that can be selectively placed into the bottom of the funnel stand. For example, a brick, free weight, sandbag or water bladder can be used as suitable ballast. This type of portable funnel stand has size and weight characteristics suitable for carrying the funnel stand by hand and may include one more handles to facilitate carrying the funnel stand by hand. In particular, the portable housing of the funnel stand may form a substantially hollow plastic enclosure.

In a permanently or semi-permanently affixed embodiment, on the other hand, the funnel stand typically includes a base plate proximate to the bottom end of the housing configured to receive anchors for affixing the funnel stand to a surface adjacent to the base plate. For a semi-permanent installation, the base plate may include a number of countersunk sockets configured to receive wood screws that can be easily driven into an underlying dock with an electric drill. A more permanent installation may use carriage bolts that extend through the base plate and dock with locknuts located on the underside of the dock.

The invention may be practiced as a method for fueling a watercraft from an adjacent loading surface while the watercraft is afloat on a body of water. In one alternative approach, an operator carries a portable funnel stand by hand and places it on the loading surface proximate to the watercraft in a free-standing configuration. The operator then extends the hose through the hose opening and into communication with an opening to a fuel tank on the watercraft. Then, while standing on the loading surface, the operator pours fuel from a hand-held gas can into the funnel stand to deliver the fuel into the fuel tank on the watercraft. The funnel stand may include a built-in ballast or the operator may locate a ballast proximate to the bottom end of the housing to stabilize the funnel stand as a free-standing device. After a desired amount of fuel has been delivered into the fuel tank on the watercraft, the operator folds or roll up the extended portion of the hose and places it within the housing for storage. The operator may then carry the funnel stand by hand away from the location proximate to the watercraft to another location.

If the portable funnel stand includes a lid covering the funnel opening, the operator may also remove the lid before pouring the fuel into the funnel and replace the lid after a desired amount of fuel has been delivered to the fuel tank. Similarly, if the funnel stand includes a door covering the hose opening, the open the door before extending the hose through the hose opening and close the hose after returning the hose to its storage location within the housing.

For a permanently or semi-permanently fixed embodiment, the invention may be practiced by affixing a funnel stand to the loading surface and then maneuvering the watercraft into a position adjacent to the loading surface proximate to the funnel stand. The operator then uses the funnel stand in the same manner described above except that the stand is typically left in place after fueling. Of course, the funnel stand could alternatively be located on the watercraft, a pole, pier, dolly, or some other suitable location or structure, but the basic operation of the device as described remains largely the same. It will be appreciated that the portable version of the funnel stand is particularly well suited to small watercraft located at private docks, where the need for the invention is considered to be most acute. It should also be understood that many other advantages and alternatives for practicing the invention will become apparent from the following detailed description of the preferred embodiments and the appended drawings.

DETAILED DESCRIPTION OF INVENTION

The present invention may be embodied as a funnel stand that includes a housing supporting an internal funnel connected to a fuel hose that can be folded or rolled up for storage inside the housing and extended through a hose opening for placement in a fuel tank opening. The funnel stand may also include a ballast for stabilization as a free-standing device or a base plate configured for permanently or semi-permanently affixing the funnel stand to a loading surface, such as a dock or sea wall. In addition, the funnel stand may include a lid covering the funnel opening, a door covering the hose opening, and handles to facilitate carrying the device by hand. The funnel stand is designed to be suitable for delivering fuel from a hand-held gas can into the fuel tanks on small watercraft, such as small boats and personal watercraft. However, it should be appreciated that the funnel stand can be used to delver fuel into any type of device that runs on liquid fuel, such as farm equipment, motorcycles, snowmobiles, unmanned aerial vehicles, electric generators, lawnmowers, chippers, and so forth. As long as the funnel stand can be placed on a loading surface above the level of the tank to be filled, the device can be used to fill any suitable type of tank with any suitable liquid. Nevertheless, the specific embodiments described below are designed to be particularly well adapted to fueling small watercraft at private docks with hand-held gas cans.

The housing of the funnel stand can be made of any suitable material, and the figures illustrate embodiments constructed from a molded plastic housing, a section of PVC pipe, and a wooden or other suitable type of box. Of course, any other material could be used, such as metal, plexiglass, fiberglass, and the like, and the housing itself could be cast into many different decorative or otherwise interesting shapes, such as the image of a tree trunk, an old man of the sea, a fish, etc. The specific housing configurations shown in the figures and described below should therefore be considered merely illustrative.

The specific embodiments described below are configured to be free-standing devices or attached to a loading surface, such as a dock. However, it should be appreciated that with minor variations these particular embodiments can be altered to make them suitable for mounting on a pole, pier, wall or side of a dock. In addition, wheels or a dolly could be easily added to the device if desired. Many other options and variations will become apparent to the skilled artisan once the principles and advantages of the invention, as illustrated by the specific embodiments described below, are understood.

Figure 1:
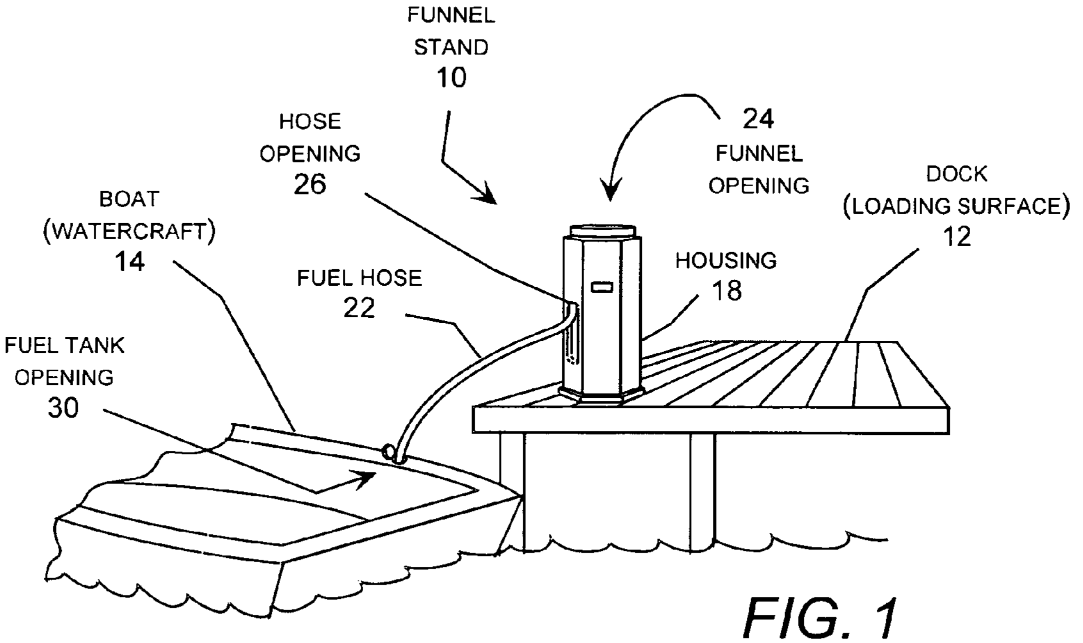
FIG. 1 is an illustration of a funnel stand located on a dock as used to fuel a boat on the water.
Figure 2:
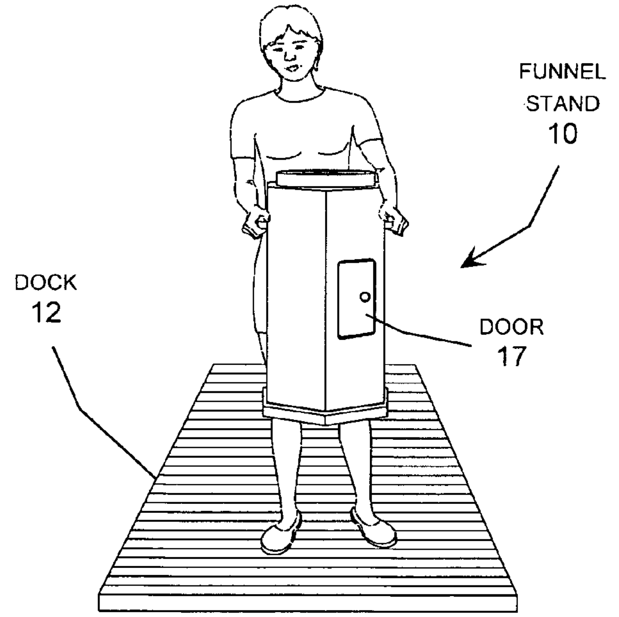
FIG. 2 is an illustration of a person carrying a funnel stand by hand on a dock.
Figure 3:
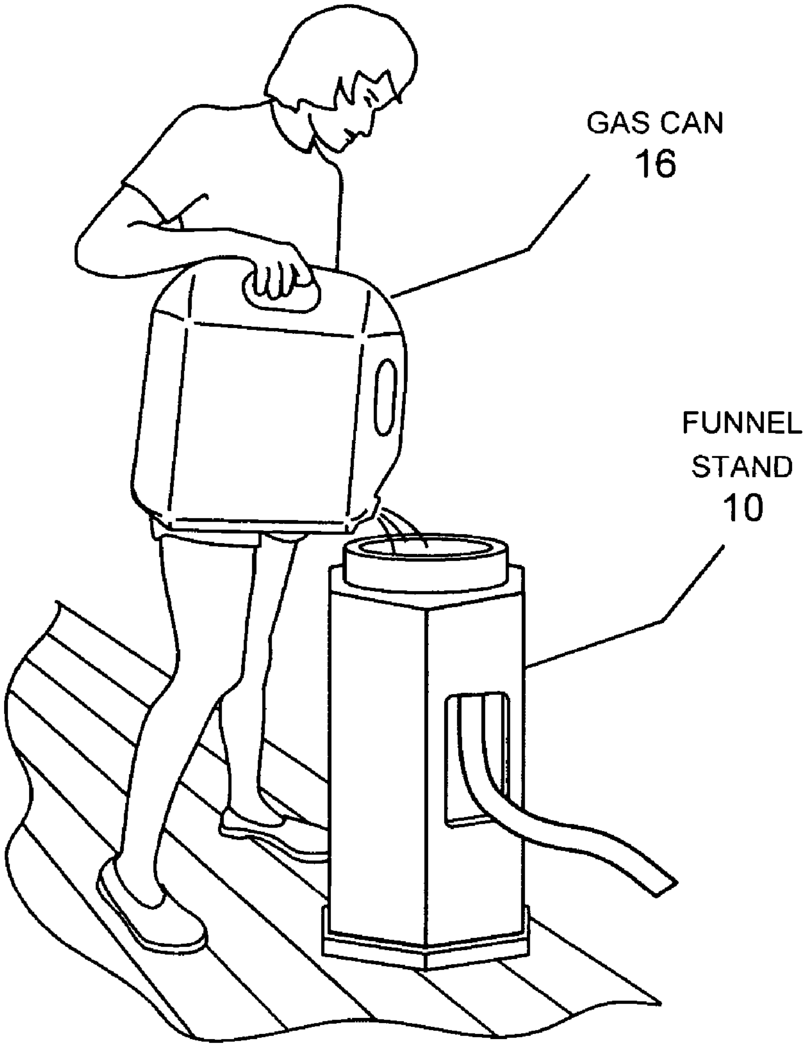
FIG. 3 is an illustration of a person pouring fuel into a funnel stand by hand for deliver the fuel into the fuel tank on a boat.

FIG. 1 shows a funnel stand 10 in its operational position on a loading surface, in this illustration a dock 12, as used to fuel a watercraft, in this illustration a boat 14, while the boat is afloat on the water. FIG. 2 is an illustration of a person carrying the portable funnel stand 10 by hand, and FIG. 3 is an illustration of a person standing on the dock and pouring fuel into the funnel stand from a hand-held gas can 16 to deliver the fuel into the fuel tank on the boat. It should be appreciated from these three figures that the funnel stand provides a safe and convenient way for one person to load fuel from the hand-held gas can into the watercraft.

Referring to FIG. 1, the funnel stand 10 includes a housing 18 having an internal funnel 20 (shown best in FIGS. 4-6) and a fuel hose 22 connected to the spigot of the funnel. The top of the housing includes a funnel opening 24 that provides access to the top of the funnel. In addition, the side of the housing includes a hose opening 26 that allows the fuel hose 22 to be extended from the funnel 20 to the fuel tank opening 30 on the boat 14, as shown in FIG. 1. As shown in FIG. 2, the funnel stand 10 may include a door 32 that selectively covers the hose opening 26 and a lid 34 that selectively covers the funnel opening 24 to keep water and debris from entering the housing when the funnel stand 10 is left outside for extended periods.

Figure 4A:
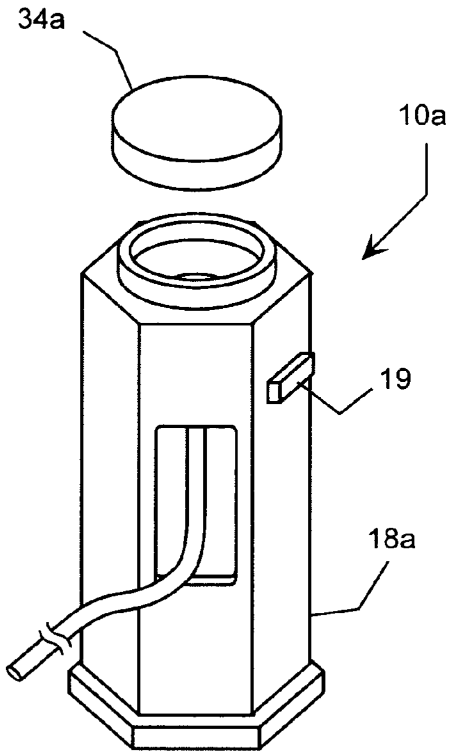
FIGS. 4A-C are perspective views of three alternative funnel stands.
Figure 4B:
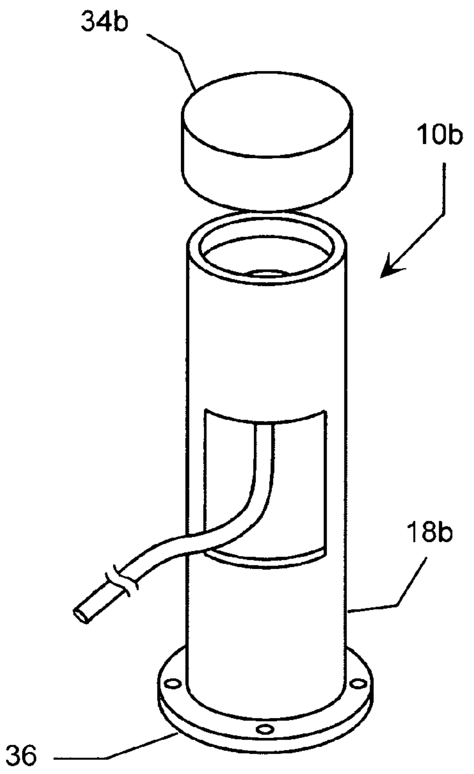
Figure 4C:
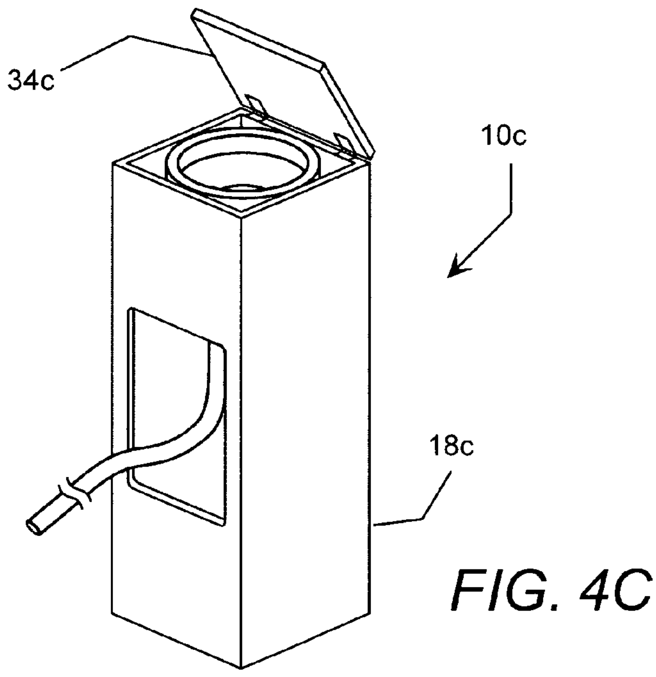

FIGS. 4A-C show three alternative embodiments of the funnel stand 10*a*-*c* with three different types of housings. FIG. 4A shows a portable funnel stand 10*a* having a housing 18*a* constructed from molded plastic and a pair of handles (only one handle 19 is shown in the figure) to facilitate carrying the device. This embodiment is suitable for mass production and is preferably designed with the internal funnel built into the molded plastic form. This allows the housing and funnel to be formed as a single unit, which avoids the need for a separate funnel and the associated assembly. A ballast to improve the stability of the funnel stand 18*a* as a free standing device may be built or entered into the bottom of the housing. For example, a sand bag or water bladder makes for a suitable ballast that does not clunk around the interior of the housing while the funnel stand is lifted and carried about by hand.

FIG. 4B shows a funnel stand 10*b* having a housing 18*b* constructed from a piece of PVC pipe approximately ten or twelve inches in diameter. This particular embodiment also includes a base plate 36 with holes for receiving anchors 38 (shown in FIG. 5) for permanently or semi-permanently affixing the funnel stand to a loading surface, such as a dock. For a semi-permanent installation, for example, the base plate 36 may include a number of countersunk sockets and the anchors 38 may be wood screws that can be easily driven into an underlying dock with an electric drill. For a more permanent installation, the anchors 38 may be carriage bolts that extend through the base plate and dock with locknuts located on the underside of the dock.

FIG. 4C shows a third alternative embodiment with a housing 18*c* constructed from wooden or other suitable boards.

This particular alternative includes a hinged lid 34*c*. Although the lids 34*a* and 34*b* for the embodiments 10*a* and 10*b* are shown as being fully removable rather than hinged, any of the embodiments can be configured with a hinged or a removable lid. In addition, any of the embodiments may include a door that selectively covers the hose opening, such as the door 32 shown in FIG. 2.

Figure 5:
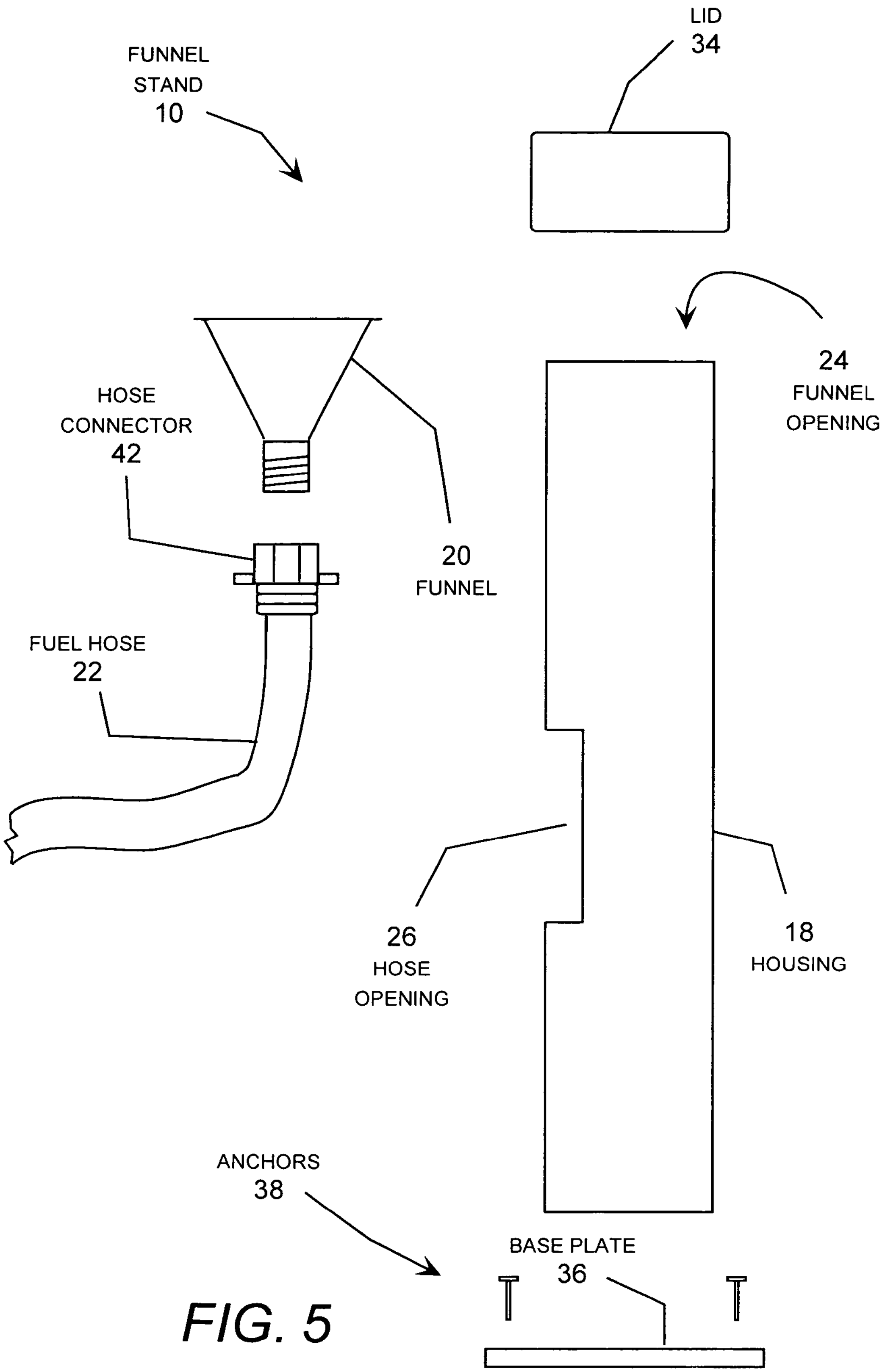
FIG. 5 is an exploded view of a funnel stand.
Figure 6:
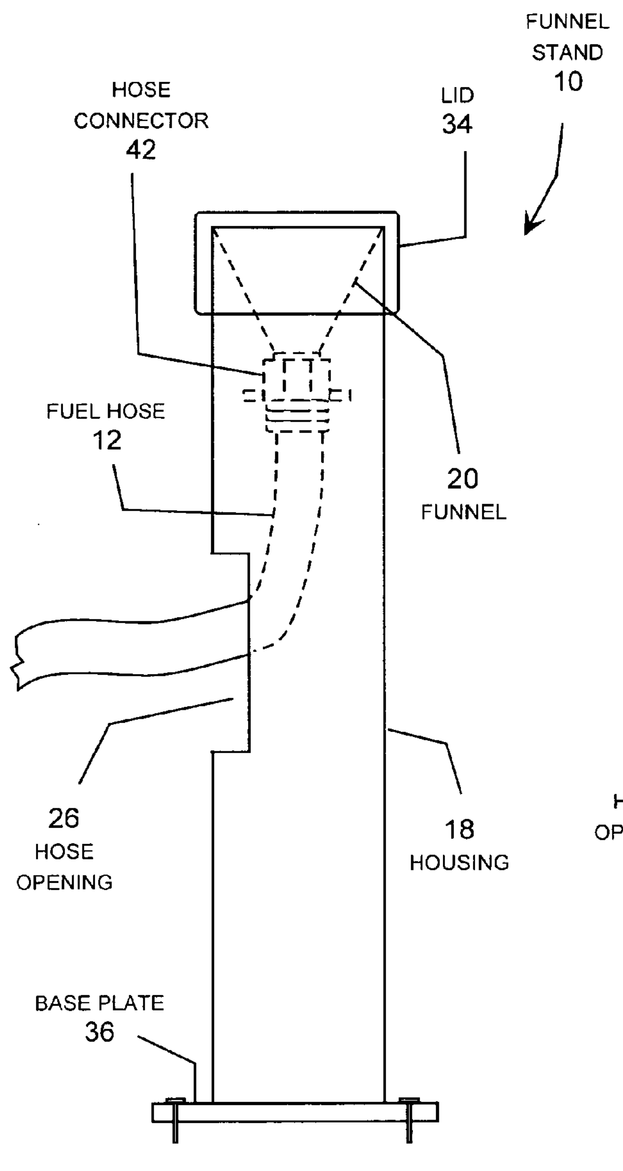
FIG. 6 is a side view of a funnel stand with the fuel hose extended through the hose opening through the housing of the fuel stand.
Figure 7:
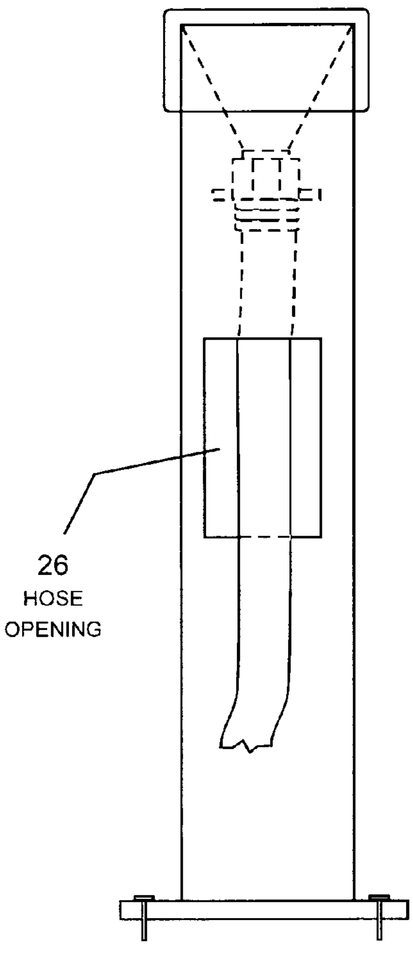
FIG. 7 is a front view of a funnel stand with the fuel hose extended through the hose opening through housing of the fuel stand.
Figure 8:
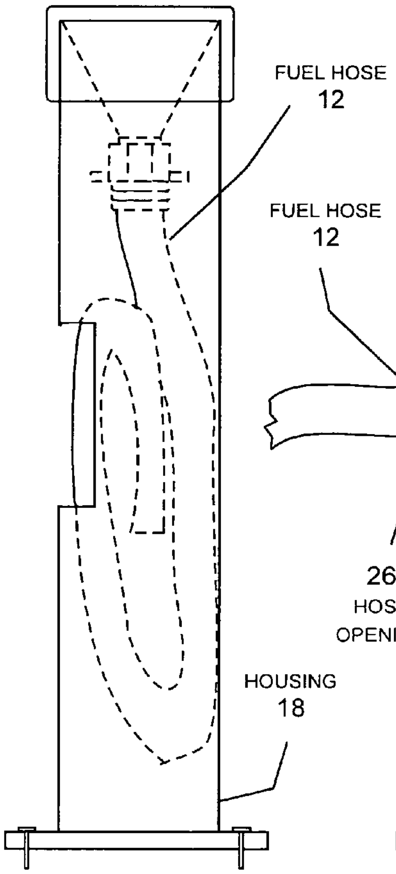
FIG. 8 is a front view of a funnel stand with the fuel hose retracted for storage inside the housing of the fuel stand.
Figure 9:
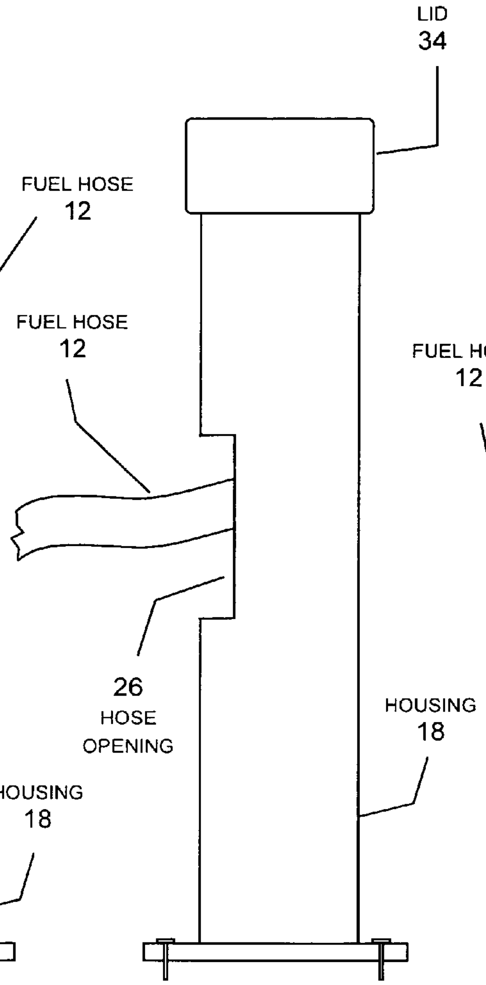
FIG. 9 is a side view of a funnel stand with the fuel hose extended through the hose opening through the housing of the fuel stand.
Figure 10:
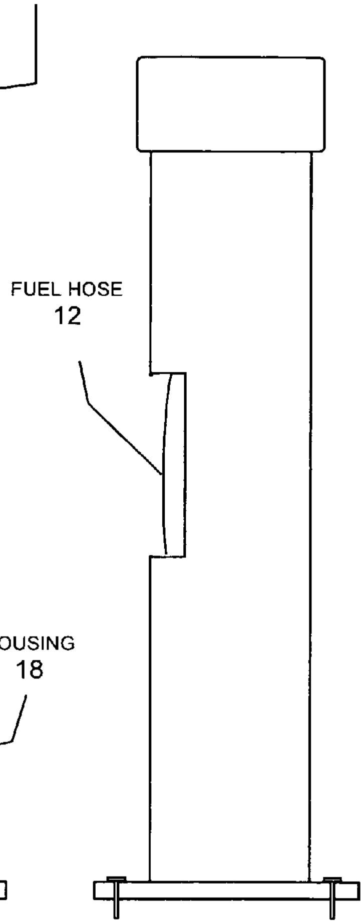
FIG. 10 is a side view of a funnel stand with the fuel hose retracted for storage inside the housing of the fuel stand.

FIG. 5 shows an exploded side view, FIG.6 shows a side view, and FIG. 7 shows front view, and FIGS. 8-10 show three side views of the funnel stand 10 A funnel 20 located in the top of the housing 18 feeds into the fuel hose 22. The funnel stand 10 may also include a base plate 36 that can, but need not, receive anchors 38 for screwing or bolting the funnel stand onto the dock. The base plate may also be formed of a heavy material to provide a ballast to give the funnel stand added stability as a free-standing device. Alternatively or additionally, the ballast, such as a free weight, sandbag or water bladder can be placed inside the housing 18. The lid 34 is designed to be removed when the funnel stand is in use and replaced when the funnel stand is not in use to keep rainwater out of the unit. As shown in FIGS. 8-10, the hose 22 can be folded or rolled up and placed inside the housing 18 for storage or extended through the hose opening 26. FIG. 8 shows the funnel stand with the fuel hose 22 folded or rolled up and placed inside the housing 18 for storage and FIG. 9 shows the funnel stand with the fuel hose extending out of the funnel stand.

Figure 11:
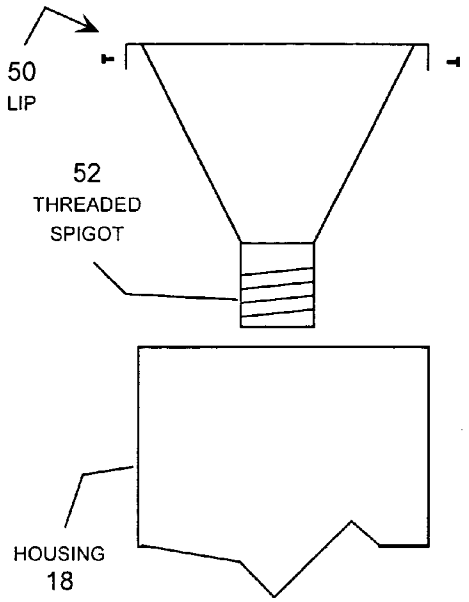
FIG. 11 is an exploded side view of the funnel and top of the housing of a funnel stand.
Figure 12:
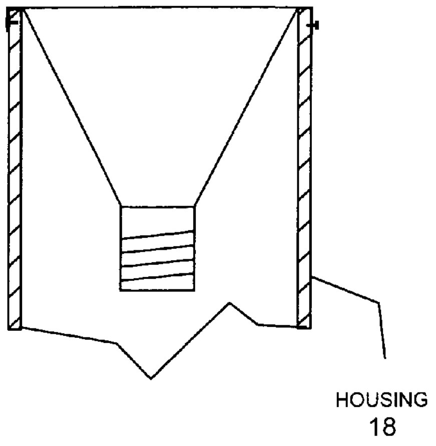
FIG. 12 is an assembled side view of the funnel and top of the housing of the funnel stand of FIG. 11.
Figure 13:
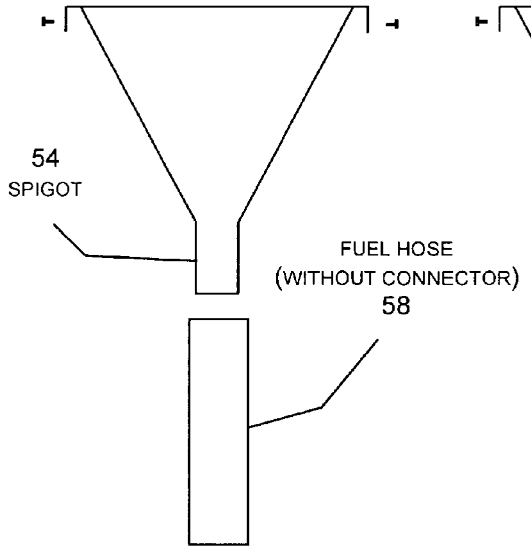
FIG. 13 is an exploded side view of the funnel and top of the fuel hose of a funnel stand.
Figure 14:
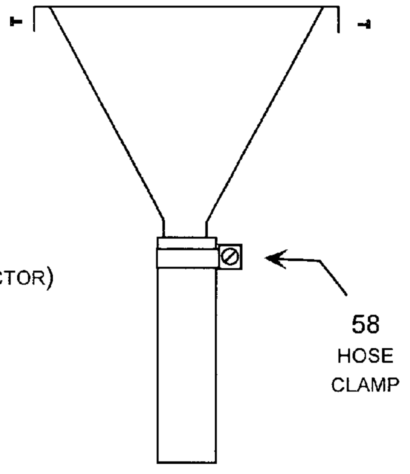
FIG. 14 is an assembled side view of the funnel and top of the fuel hose of the funnel stand of FIG. 13.

As shown in FIGS. 11 and 12, the funnel 20 may include a lip 50 that extends over the housing 16. The lip may be screwed or otherwise fastened to the funnel stand to secure the funnel in place. FIGS. 11 and 12 also show a funnel with an externally threaded spigot 52 used in this particular embodiment. FIGS. 13 and 14 show an alternative embodiment that includes a funnel with funnel spigot 54 that need not be threaded, but is instead designed to receive a hose 56 that fits over the spigot. A hose clamp 58 can be used to hold the hose in place in this embodiment. Of course, the dimensions of the various parts, the materials used to construct the funnel stand, and the length and diameter of the hose can be varied to suite different applications.

It should be noted that the housing of the funnel stand preferably forms a substantially closed enclosure to keep water and debris out of the housing. Nevertheless, the funnel stand could be configured with a substantially open housing, such as a frame with one or more open sides. In addition, the funnel stand could be equipped with an internal hose reel and a hand or motor operated crank to wind and unwind the hose. Many other alterations and embellishments on the basic designs described above will become apparent to the skilled artisan once the principles of the invention have been understood. It should therefore be understood that the foregoing relates only to the exemplary embodiments of the present invention, and that numerous changes may be made therein without departing from the spirit and scope of the invention as defined by the following claims.

The invention claimed is:

1. A funnel stand for delivering fuel into a fuel tank, comprising:

a housing defining a hose storage area, a bottom end, and a top end having a funnel opening;

a funnel supported by the housing in communication with the funnel opening in the top of the housing and comprising a spout; and a fuel hose at least partially located within the housing and extending from the spout of the funnel to a delivery end of the hose, the hose configured to be selectively retracted for storage substantially within the hose storage area of the housing or extended with a portion of the hose extending outside the housing for placement with the delivery end of the hose in communication with a fuel tank opening;

wherein the hose forms a tubular conduit extending from the funnel to the delivery end of the hose for delivering fuel poured into the funnel into the fuel tank.

2. The funnel stand of claim 1, further comprising a lid configured for selective placement over and removal from the funnel opening to provide selective access to the funnel.

3. The funnel stand of claim 1, further comprising a ballast proximate to the bottom end of the housing for stabilizing the funnel stand as a free-standing device.

4. The funnel stand of claim 1, further comprising a base plate proximate to the bottom end of the housing comprising anchors or anchor receptacles for affixing the funnel stand to a surface adjacent to the base plate.

5. The funnel stand of claim 1, further configured for portability by hand.

6. The funnel stand of claim 5, further comprising one more handles to facilitate carrying the funnel stand by hand.

7. The funnel stand of claim 1, further comprising a door selectively covering the hose opening.

8. The funnel stand of claim 1, wherein the housing comprises a substantially hollow plastic enclosure.

9. A method for fueling a watercraft from an adjacent loading surface while the watercraft is afloat on a body of water, comprising the steps of:

carrying a portable funnel stand by hand and placing the funnel stand on the loading surface proximate to the watercraft in a free-standing configuration, the portable funnel stand comprising a housing defining a hose storage area and comprising a hose opening, a bottom end, and a top end having a funnel opening, a funnel supported by the housing in communication with the funnel opening in the top of the housing and comprising a spout, and a fuel hose in communication with the spout of the funnel and configured to be selectively retracted for storage within the housing or extended through the hose opening for placement in communication with a fuel tank opening;

extending the hose through the hose opening and into communication with an opening to a fuel tank on the watercraft; and while standing on the loading surface, pouring fuel from a hand-held gas can into the funnel of the funnel stand to deliver the fuel into the fuel tank on the watercraft.

10. The method of claim 9, further comprising the step of locating a ballast proximate to the bottom end of the housing to stabilize the funnel stand as a free-standing device.

11. The method of claim 9, further comprising the step of folding or rolling the extended portion of the hose and placing it within the housing for storage after a desired amount of fuel has been delivered into the fuel tank on the watercraft.

12. The method of claim 11, further comprising the steps of carrying the funnel stand by hand away from the location proximate to the watercraft to another location after folding or rolling the extended portion of the hose and placing it within the housing for storage.

13. The method of claim 12, further comprising the step of removing a lid that selectively blocks access to the funnel before pouring the fuel into the funnel, and replacing the lid after a desired amount of fuel has been delivered to the fuel tank.

14. The method of claim 13, further comprising the step of opening a door that selectively blocks access to the hose opening before extending the hose through the hose opening, and closing the door after folding or rolling the extended portion of the hose and placing it within the housing for storage.

15. A method for fueling a watercraft from a loading surface while the watercraft is afloat on a body of water, comprising the steps of:

affixing a funnel stand to the loading surface, the funnel stand comprising a housing defining a hose storage area and comprising a hose opening, a bottom end, and a top end having a funnel opening, a funnel supported by the housing in communication with the funnel opening in the top of the housing and comprising a spout, and a fuel hose in communication with the spout of the funnel and configured to be selectively retracted for storage within the housing or extended through the hose opening for placement in communication with a fuel tank opening;

placing the watercraft adjacent to the loading surface proximate to the funnel stand;

extending the hose through the hose opening and into communication with an opening to a fuel tank on the watercraft;

while standing on the loading surface, pouring fuel from a hand-held gas can into the funnel of the funnel stand to deliver the fuel into the fuel tank on the watercraft.

16. The method of claim 15, further comprising the step of folding or rolling the extended portion of the hose and placing it within the housing for storage after a desired amount of fuel has been delivered into the fuel tank on the watercraft.

17. The method of claim 16, further comprising the steps of carrying the funnel stand by hand away from the location proximate to the watercraft to another location after folding or rolling the extended portion of the hose and placing it within the housing for storage.

18. The method of claim 17, further comprising the step of removing a lid that selectively blocks access to the funnel before pouring the fuel into the funnel, and replacing the lid after a desired amount of fuel has been delivered to the fuel tank.

19. The method of claim 18, further comprising the step of opening a door that selectively blocks access to the hose opening before extending the hose through the hose opening, and closing the door after folding or rolling the extended portion of the hose and placing it within the housing for storage.

* * * * *